United States Patent Office 3,062,813
Patented Nov. 6, 1962

---

3,062,813
NOVEL SYNTHESIS OF SULFONAMIDES
Francis L. Scott, Elkins Park, Pa., assignor to Pennsalt Chemicals Corporation, Philadelphia, Pa., a corporation of Pennsylvania
No Drawing. Filed May 13, 1960, Ser. No. 28,845
8 Claims. (Cl. 260—239.8)

This invention relates to a novel process for the preparation of sulfonamides. More particularly, this invention deals with the preparation of sulfonamides by cleavage of sulfamide and certain substituted sulfamides in the presence of a secondary or a tertiary aromatic amine.

It is stated in a report on the work of Vollmann and Geilenkirchen as disclosed in the Office of Technical Services Report PB 103, 755 (Bibliog. Tech. Reports 16: 38, Aug. 17, 1951), that when 1,3-diphenylsulfamide is heated at 180° to 200° C. in undisclosed solvents, a rearrangement of 1,3-diphenylsulfamide occurs to yield sulfanilanilide

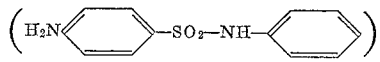

During attempts to study and reproduce this rearrangement it has been found that when 1,3-diphenylsulfamide is heated alone at 150° to 160° C. less than 1% of it is converted to the sulfonamide because of the thermal instability of this substituted sulfamide. When heated in xylene (B.P. ca. 140° C.), complete destruction of the sulfamide also occurred, but no sulfonamide was formed. Likewise, when refluxed in acetic acid (B.P. 118° C.), acetic anhydride (B.P. 140° C.), pyridine (115° C.), benzene (80° C.), and in aqueous acids (HCl) or bases (NaOH) either the 1,3-diphenylsulfamide was destroyed or products other than sulfanilanilide were formed. Thus, in spite of the vague prior art statements, no method is known to obtain sulfonamide products from 1,3-diphenylsulfamide or related sulfamides.

It has now been found that valuable sulfonamides are readily obtained by carrying out a cleavage of sulfamide or of sulfamides mono-substituted at one or both nitrogen atoms with an aromatic or heterocyclic radical, said cleavage being carried out in a solvent comprising an aromatic secondary or tertiary amine. This process is of particular value because the products that result have bactericidal and pharmaceutical value and this invention provides novel routes to sulfonamide drugs of this type.

The following equation illustrates the reaction:

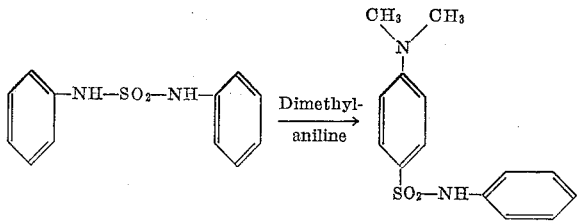

The sulfamides which may be used in this process are those having the structure R—NH—SO$_2$—NH—R, where R is a member selected from the group of hydrogen, aromatic, and heterocyclic radicals and in which the R groups may be the same or different. It will be noted that each nitrogen atom has at least one hydrogen atom attached to it and this is necessary because tri- and tetra-substituted sulfamides are inoperable in this invention. The substituted sulfamides of the above structure are readily obtained in good yield by known methods such as by reacting the appropirate amines with sulfuryl chloride; e.g.:

An alternate and frequently useful procedure is to prepare the substituted sulfamide by reacting sulfamide (NH$_2$—SO$_2$—NH$_2$, obtained from sulfuryl chloride and excess ammonia) and an amine, RNH$_2$, where R is defined above; viz.:

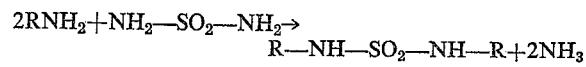

It will be understood that this last reaction can be carried out in two steps with different amines to obtain substituted sulfamides with different R groups. Some sulfamides which are particularly useful in the process of this invention include those where the R radicals are phenyl, naphthyl, tolyl, xylyl, thiazolyl, imidazolyl, pyridyl, triazolyl, benzimidazolyl, quinolyl, isoquinolyl, and such radicals having substituents such as hydroxyl, alkoxyl, nitro, trifluoromethyl, halogeno, and like radicals. Some specific 1,3-substituted sulfamides which may be used are 1-phenylsulfamide, 1,3-diphenylsulfamide, 1-p-tolylsulfamide, 1,3-di-o-tolylsulfamide, 1-phenyl-3-(1' or 2') naphthylsulfamides, 1,3-di-2'-pyridylsulfamide, 1,3-di-2'-quinolylsulfamide, 1,3-di-2'-isoquinolylsulfamide, 1,3-di-p-chlorophenylsulfamide, 1-p-nitrophenyl-3-o-tolylsulfamide, 1-p-ethoxyphenyl-3-(2'-pyridyl) sulfamide, 1,3-bis-(2',3',4'-trichlorophenyl) sulfamide, 1,3-bis(2',4'-dichloro-5'-bromophenyl) sulfamide, 1,3-bis(3'-trifluoromethyl-4'-chlorophenyl) sulfamide and the like. Many halogen and trifluoromethyl substituted diphenylsulfamides useful in this invention are disclosed and their preparation given in U.S. 2,867,658.

The aromatic amine employed in the process will be a secondary or a tertiary amino substituted aromatic hydrocarbon and will have the structure

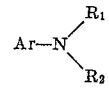

where Ar is an aromatic hydrocarbon radical (e.g. phenyl, tolyl, xylyl, naphthyl and the like), R$_1$ is H or an alkyl radical, and R$_2$ is an alkyl radical. It is preferred that R$_1$ and R$_2$ be lower alkyl radicals such as methyl, ethyl, propyl and butyl. Specific amines which may be used include N-methylaniline, N-ethylaniline, N,N-dimethylaniline, N-methyl-N-ethylaniline, N,N-diethyl-o-toluidine, N,N-dimethyl-β-naphthylamine, N-methyl-α-naphthylamine, N,N-di-n-propylaniline, N,N-dimethyl-sym-xylidene and the like.

The cleavage process of this invention is carried out easily without the use of special equipment or complex procedure. The reaction is carried out by using an excess of the tertiary aromatic amine which acts as solvent for the sulfamide reactant. Usually the amount of aromatic amine used will be at least about 1 mole, and preferably 10 to 20 moles, per mole of the sulfamide taken. The process proceeds readily at temperatures between about 120° and about 250° C., preferably between about 150° and 180° C., and is completed in a few hours. At temperatures below about 120° C., the rate of reaction is impractically slow and temperatures above about 250° C. cause pyrolysis of the reactants and products. It is often advisable to accelerate the reaction with an acid catalyst and preferably the catalyst selected will be the mineral acid salts (e.g., the hydrochloride) of the amine used. The amount of catalyst used will usually be between 20 and 100 mole percent of the sulfamide used. However, a catalyst is not essential because the sulfamide reactant is somewhat acidic and thus renders the process autocatalytic. Although the reaction need not be carried out under strictly anhydrous conditions the process will usually avoid the presence of water because of hydrolysis of the sulfamide reactant to sulfamic acid.

When the reaction is completed the reaction mass is cooled to room temperature and filtered to remove any solid material (e.g., amine salts if a catalyst is used) and the product isolated from the filtrate. This is readily done by salting out with ether, extraction with aqueous base, or combinations of these or other well known isolation techniques.

The mechanism by which this process is thought to involve formation of a reactive sulfamylonium ion as follows:

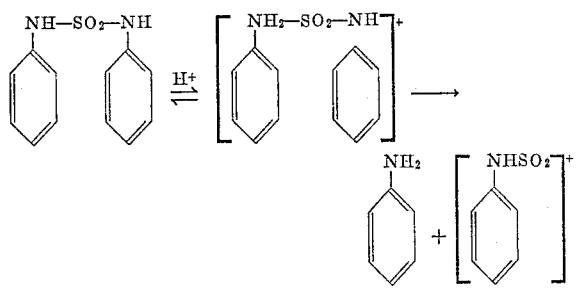

The sulfamylonium ion then reacts in a nucleophilic manner with the aromatic amine species; viz.:

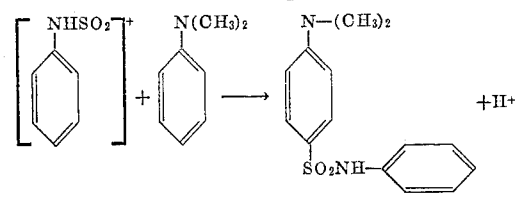

It is significant to note that the reaction does not proceed with certain other species that normally permit a nucleophilic attack; e.g., phenolic ethers.

In view of this mechanism it is seen that with disubstituted sulfamides the final sulfonamide product retains one of the nitrogen substituents of the original sulfamide. It is clear that when the original sulfamide reactant is symmetrical, only one product is possible. However, when an unsymmetrical, mono-substituted or 1,3-disubstituted sulfamide is used, both possible products will be obtained although it is likely that one product will predominate depending upon the electron distribution and other inherent properties of the molecule. However, it cannot be predicted accurately which products will predominate.

It has been found that when a primary aromatic amine is reacted with a substituted sulfamide a different reaction process occurs. In such a process, the reaction proceeds first through an exchange reaction whereby the 1,3-substituents are replaced by the primary amine moiety and then rearrangement occurs; viz.:

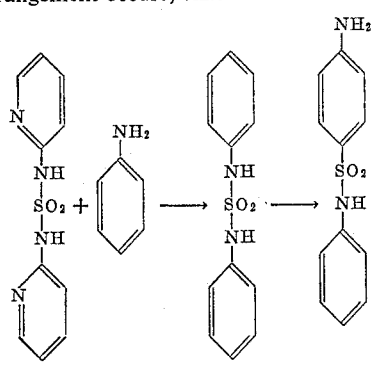

Thus, the end-product is controlled completely by the primary aromatic amine, regardless of the starting sulfamide. In the process of the present invention, however, the final sulfamide product is influenced by both starting sulfamide and the secondary or tertiary aromatic amine.

As indicated, an important advantage of this process is that it provides a rather simple route to a wide variety of sulfonamide products related to the well known sulfa drugs. Examples of such sulfonamide compounds will be found in the disclosure of French Patent No. 846,191 which discloses sulfonamides of structure

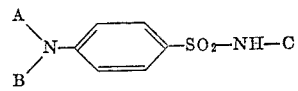

where A and B are alkyl groups and C is a heterocyclic radical selected from the group of pyridine, quinolyl and isoquinolyl radicals.

In order to further describe this invention the following examples are given:

EXAMPLE 1

*4-Dimethylaminobenzenesufonanilide*

A mixture of 2.0 g. (8.04 mmoles) of 1,3-diphenylsulfamide, 1.05 g. (8.04 mmoles) of aniline hydrochloride and 19.12 g. (157.7 mmoles) of redistilled N,N-dimethylaniline is heated for a total of 4 hours at 150° C. with vigorous stirring throughout. The color of the reaction liquor slowly changes from a brown-green to deep red and finally it is deep purple. No basic fumes (i.e. ammonia) are detected. The reaction liquor is allowed to cool and to stand overnight at ambient temperatures. It is then diluted with ether and extracted with 0.5 N sodium hydroxide solution. The aqueous portion on acidification deposits 470 mg. of white solid of M.P. 176–181°. After careful recrystallization of this material from aqueous ethanol, it melts at 180–182.5°.

*Analysis.*—Calcd. for $C_{14}H_{16}N_2SO_2$: C, 60.80; H, 5.84; N, 10.12; S, 11.58. Found: C, 60.91; H, 5.62; N, 10.10; S, 11.06.

The material isolated in 26% yield is identified as 4-dimethylaminobenzenesulfonanilide of structure

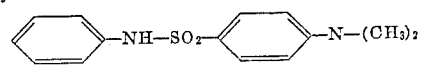

EXAMPLE 2

*4-Dimethylamino-4'-Methylbenzenesulfonamide*

A mixture of 2.0 g. (7.2 mmoles) of 1,3-di-p-tolylsulfamide, 1.03 g. (7.2 mmoles) of p-toluidine hydrochloride and 20 ml. (19.12 gm., 157.7 mmoles) of N,N-dimethylaniline is heated at 150° for 3 hours, while being stirred vigorously throughout. The solution darkens considerably during the heating period. It is allowed to cool and to stand at ambient temperatures for 42 hours. It is then filtered and 1.53 g. of buff colored solids, M.P. 180–200°, which are completely water soluble (and which are apparently largely p-toluidine hydrochloride) are obtained. The residual liquor is diluted with ether, and the ethereal solution is extracted with 0.5 N sodium hydroxide solution. On acidification and further workup of the aqueous phase 490 mg. (24%) of material, M.P. 163–170° is obtained. After recrystallization from aqueous ethanol this has a M.P. 169–174° C. It is 4-dimethylamino-4'-methylbenzenesulfonanilide of structure

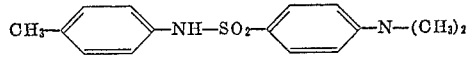

*Analysis.*—Calcd. for $C_{15}H_{18}N_2SO_2$: C, 62.07; H, 6.21; N, 9.65. Found: C, 62.33; H, 6.51; N, 9.61.

EXAMPLE 3

*Reaction in Absence of Catalyst*

A mixture of 2.0 g. of 1,3-di-p-tolysulfamide and 19.2 g. of N,N-dimethylaniline is refluxed for 3 hours. The reaction mass is then cooled to room temperature and the small amount of solid product is filtered off.

To the filtrate is added 90 ml. of anhydrous ether, but no further solid separates from the dark yellow mother liquor. This mixture is then extracted 3 times with 50 ml. portions of 0.5 N sodium hydroxide solution. The aqueous extracts are combined and treated with concentrated hydrochloric acid, dropwise (the solution being maintained in an ice-bath), until the pH of the solution reaches a value of 9. By that time 1.10 g. of a light brown colored solid, M.P. 142–154°, is deposited. This light brown solid is carefully fractionated from aqueous ethanol and a total of 900 g. (43% yield) of white solid (M.P. 173–177° C.) is obtained. This solid is identified as 4-dimethylamino-4'-methylbenzenesulfonanilide.

EXAMPLE 4

A mixture of 1 g. (4.02 mmoles) of 1,3-diphenylsulfamide and 10 ml. (9.56 g., 78.9 mmoles) of freshly distilled N,N-dimethylaniline is refluxed for a period of four hours. The dark-yellow reaction mixture, in which some light-yellow crystals are deposited at the end of the refluxing period is allowed to stand for a period of 3 days. The mixture is then filtered and 680 mg. of crude solid (M.P. 110–153° C.), is obtained. After careful recrystallization of this solid from ethanol and water, a total of 340 mg. (38%) of pure white material, M.P. 179–182° C. is collected.

The IR spectrum of this product is identical with that of the product of Example 1; it does not depress the melting point of the product of Example 1.

*Analysis.*—Calcd. for $C_{14}H_{16}N_2O_2S$: C, 60.80; H, 5.84. Found: C, 60.70; H, 5.60.

EXAMPLE 5

A mixture of 39.29 g. of 2-amino pyridine and 20 g. of sulfamide in 200 g. of pyridine is refluxed for 45 minutes. Then the reaction mass is cooled and the solid that forms is filtered off and subsequently identified as ammonium imidodisulfamide. The pyridine filtrate is then refluxed for another 5 hours and then cooled overnight. The white deposite is filtered off and identified as 1-(2'-pyridyl) sulfamide. Then the filtrate is vacuum distilled to remove pyridine leaving a yellow oily residue. This is crystallized by treating with either acetone-water, ethanol-water or dimethylformamide-water mixtures and a crude product is obtained. After crystallization from aqueous dimethylformamide this is identified as 1,3-di-(2-pyridyl) sulfamide (M.P. 218°–222° C.).

A solution of 1.50 g. (6 mmoles) of 1,3-di-(2'-pyridyl) sulfamide and 0.83 g. (6 mmoles) of triethylamine hydrochloride in 20 ml. (19.12 g., 0.158 moles) of freshly distilled dimethylaniline is heated for 3 hours at 150°. During this period the solution's color changes from a light yellow to a dark red-brown. The liquor is then ice-cooled and filtered. The gray solid that is isolated is washed with ether to remove traces of solvent. It weighs 2.04 g. and has a melting point range of 100° to 160° C. It is then washed with water and 0.71 g. of material (M.P. 215–200°) remains after drying. From the yellow aqueous solution, 0.6 g. of triethylamine hydrochloride is recovered. The water insoluble solid is recrystallized from ethanol (using a little charcoal) and yields a gray powder (0.51 g.; M.P. 225° to 229° C.). It corresponds to 4-dimethylaminobenzenesulfon - (2' - pyridyl)-amine having the structure

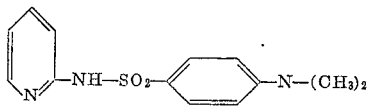

*Analysis.*—Calcd. for $C_{13}H_{15}N_3O_2S$: C, 56.70; H, 5.42; N, 15.18; S, 11.55. Found: C, 56.30; H, 5.49; N, 15.18; S, 11.66.

When 1 g. of 1,3-di(2'-pyridyl) sulfamide and 20 g. of dimethylaniline are refluxed for 4 hours at 185° C. without catalyst a quantitative crude yield of 4-dimethylaminobenzenesulfon-(2'-pyridyl)-amide is obtained.

When a solution of the 1,3-di(2'-pyridyl) sulfamide in aniline with or without aniline hydrochloride as catalyst is refluxed for three hours, however, the only products that are isolated are sulfanilanilide and 1,3-diphenylsulfamide.

EXAMPLE 6

A mixture of 696 mg. (4.05 mmoles) of mono-phenylsulfamide, 529 mg. (4.05 mmoles) of triethylammonium chloride and 20 ml. of N,N-dimethylaniline is heated at 150° for 3 hours, with vigorous stirring. The solution is then allowed to cool, and to the brown mother liquor is then added 200 ml. of ether. The mass is filtered to remove the solid catalyst salt and the filtrate is then extracted 3 times with 30 ml. portions of 0.5 N sodium hydroxide solution. The first 30 ml. extract is carefully treated with acid until its pH reaches 7, and a small quantity of solid separated (29 mg.; M.P. 148°–155°). This is recrystallized from an ethanol-water mixture and yields 2 crops: one 10 mg., M.P. 150°–156° C., the other 15 mg., M.P. 172°–175° C. Both crops of crystals have infrared spectra identical with that of 4-dimethylaminobenzenesulfonanilide. The higher melting crop also does not depress the melting point of an authentic sample of the product.

EXAMPLE 7

To 5.0 g. (0.0521 mole) of sulfamide is added 40 ml. of redistilled N,N-dimethylaniline. The mixture is heated at reflux for 4 hours, with vigorous stirring throughout. After this heating period a considerable quantity of dark colored solid is deposited. The hot liquor is decanted off and cooled in ice. A solid deposits and this is washed with ether to remove all traces of solvent. After drying, the product weighs 500 mg., and has a melting point of 200°–206° C. It does not depress the M.P. of an authentic sample of 4-dimethylaminobenzenesulfonamide.

EXAMPLE 8

A mixture of 1,3-di-p-tolylsulfamide and N,N-diethylaniline is heated at reflux for 4 hours. On work-up 4-diethylamino-4'-methylbenzenesulfanilide is isolated.

EXAMPLE 9

A mixture of 1,3-di-(3'-trifluoromethyl-4' - chloro) phenylsulfamide (prepared as in U.S. 2,867,658) and an excess of N,N-dimethylaniline is heated at reflux for 3 hours. On work-up, 4-dimethylamino-(3'-trifluoromethyl-4'-chloro) benzenesulfonanilide is obtained.

EXAMPLE 10

To 40 ml. of freshly distilled N-methylaniline is added 1.10 g. of 1,3-diphenylsulfamide. The light yellow-colored solution is then refluxed at 197° C. for 17 hours. The golden colored liquor thus obtained is cooled in ice. 250 ml. of ether are added. The ethereal liquor is then extracted with four 50 ml. aliquots of 0.5 N NaOH solution. The bulked alkaline extracts are cautiously treated with concentrated HCl until a pH of 7 is reached. At this point, 400 mg. of light brown colored solid, M.P. 144–152° C., deposits. After recrystallization from aqueous ethanol this is obtained as white matted needles, M.P. 166–168° C. It corresponds to 4-methylaminobenzenesulfonanilide, i.e.

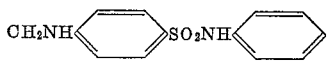

The over-all yield is about 40%.

*Analysis.*—Calcd. for $C_{13}H_{14}N_2SO_2$: C, 59.54; H, 5.34; N, 10.68. Found: C, 59.55; H, 4.36; N, 9.92.

EXAMPLE 11

An attempt to cause a similar reaction with 1,3-dimethyl-1,3-diphenylsulfamide is made as follows:

1,3-dimethyl-1,3'-diphenylsulfamide is heated at 150° C. for 3.5 hours with an equimolar amount of triethylammonium hydrochloride in a large excess of N,N-dimethylaniline. On working up the reaction mass 98% of the tetrasubstituted sulfamide is recovered, no reaction having taken place.

EXAMPLE 12

Reaction with 1,1-dimethyl-3-phenylsulfamide is likewise shown to be inoperable. This substituted sulfamide is prepared as follows. First, dimethylamine hydrochloride is refluxed with an excess of sulfuryl chloride for 20 hours, and the dimethylsulfamyl chloride thus obtained, after isolation, is reacted with aniline to yield the desired trisubstituted sulfamide. This material after recrystallization from anhydrous methanol is obtained as a cream-colored solid (M.P. 85–86°, reported M.P. 84–85°).

*Analysis.*—Calcd. for $C_8H_{12}N_2O_2S$: C, 48.0; H, 6.0; Found: C, 47.2; H, 5.8.

When 1 molar proportion of this trisubstituted sulfamide is heated with 1 molar proportion of triethylammonium chloride in an excess of N,N-dimethylaniline for 2.5 hours at 145°, no product can be isolated and 64% of the starting material was recovered.

EXAMPLE 13

In like manner, when 1,3-dimethylsulfamide is reacted with N,N-dimethylaniline the expected sulfonamide product cannot be isolated from the reaction mass.

It will be understood by the skilled artisan that many changes and variations are obvious from the above description and examples and accordingly such changes are to be construed as falling within the spirit and scope of this invention.

I claim:

1. A process for the preparation of sulfonamides which comprises heating a solution of a sulfamide in an aromatic amine having the structure

where Ar is an aromatic hydrocarbon radical containing six to ten carbon atoms, $R_1$ is a member selected from the group consisting of hydrogen and lower alkyl radicals, and $R_2$ is a lower alkyl radical at a temperature between about 120° C. and about 250° C., said sulfamide having the structure R—NH—$SO_2$—NH—R where R is a radical selected from the group consisting of hydrogen, aromatic, heterocyclic, substituted aromatic and substituted heterocyclic radicals wherein said aromatic and heterocyclic radicals contain from 5 to 10 carbon atoms and said substituents are selected from the group consisting of hydroxyl, alkoxyl, nitro, trifluoromethyl, and halogeno substituents.

2. The process of claim 1 wherein the lower alkyl-amino substituted aromatic hydrocarbon is a secondary amine.

3. The process of claim 1 wherein the amine is N-methylaniline.

4. A process for the preparation of sulfonamides having the structure

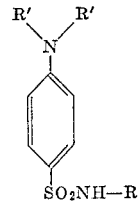

where R is a radical selected from the group consisting of hydrogen, aromatic, heterocyclic, substituted aromatic, and substituted heterocyclic radicals wherein said aromatic and heterocyclic radicals contain from five to ten carbon atoms and said substituents are selected from the group consisting of hydroxyl, alkoxyl, nitro, trifluoromethyl, and halogeno substituents and R' is a lower alkyl radical which comprises heating at a temperature between about 150° C. and 180° C. a mixture of one mole of a sulfamide of structure R—NH—$SO_2$—NH—R where R is defined above with from about 10 to about 20 moles of an amine of structure

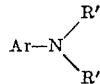

where Ar is an aromatic hydrocarbon radical containing six to ten carbon atoms and the R' radicals are lower alkyl radicals.

5. The process of claim 4 wherein the R radicals are phenyl and the amine is dimethylaniline.

6. The process of claim 4 wherein the R radicals are p-tolyl and the amine is dimethylaniline.

7. The process of claim 4 wherein the sulfamide is 1,3-di-(2'-pyridyl) sulfamide.

8. The process of claim 4 wherein the sulfamide is 1,3-di-(3'-trifluoromethyl-4'-chloro) phenylsulfamide.

No references cited.

UNITED STATES PATENT OFFICE
CERTIFICATE OF CORRECTION

Patent No. 3,062,813                      November 6, 1962

Francis L. Scott

It is hereby certified that error appears in the above numbered patent requiring correction and that the said Letters Patent should read as corrected below.

Column 1, line 69, for "appropirate" read -- appropriate --; column 3, line 8, after "process" insert -- proceeds --; column 5, line 52, for "(M.P. 215-200°)" read -- (M.P. 215-220°) --; line 58, for "-amine" read -- -amide --; column 6, lines 59 to 61, the formula should appear as shown below instead of as in the patent:

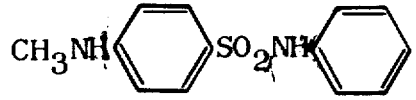

Signed and sealed this 9th day of April 1963.

(SEAL)
Attest:

ESTON G. JOHNSON                          DAVID L. LADD
Attesting Officer                        Commissioner of
                                                                          Patents